United States Patent
Grehant et al.

(10) Patent No.: US 12,153,882 B2
(45) Date of Patent: Nov. 26, 2024

(54) UNSUPERVISED EMBEDDING METHODS FOR SIMILARITY BASED INDUSTRIAL COMPONENT MODEL REQUESTING SYSTEMS

(71) Applicant: DASSAULT SYSTEMES, Velizy-Villacoublay (FR)

(72) Inventors: Xavier Grehant, Velizy-Villacoublay (FR); Benoit Duval, Velizy-Villacoublay (FR); Samu Tamminen, Velizy-Villacoublay (FR)

(73) Assignee: DASSAULT SYSTEMES, Velizy-Villacoublay (FR)

( * ) Notice: Subject to any disclaimer, the term of this patent is extended or adjusted under 35 U.S.C. 154(b) by 350 days.

(21) Appl. No.: 17/506,475

(22) Filed: Oct. 20, 2021

(65) Prior Publication Data
US 2022/0121819 A1    Apr. 21, 2022

(30) Foreign Application Priority Data
Oct. 20, 2020  (EP) .................................... 20306250

(51) Int. Cl.
*G06F 40/279* (2020.01)
*G06F 40/166* (2020.01)

(52) U.S. Cl.
CPC .......... *G06F 40/279* (2020.01); *G06F 40/166* (2020.01)

(58) Field of Classification Search
None
See application file for complete search history.

(56) References Cited

U.S. PATENT DOCUMENTS 11,556,698 B2 *   1/2023  Galitsky ................ G06N 3/006
2009/0144620 A1 * 6/2009  Bauchot ................ G06F 40/103
                                                            715/277

(Continued)

FOREIGN PATENT DOCUMENTS

WO    WO 2018/213205 A1    11/2018

OTHER PUBLICATIONS

Nooralahzadeh, Farhad, Lilja Øvrelid, and Jan Tore Lønning. "Evaluation of domain-specific word embeddings using knowledge resources." Proceedings of the eleventh international conference on language resources and evaluation (LREC 2018). 2018. (Year: 2018).*

(Continued)

*Primary Examiner* — Douglas Godbold
(74) *Attorney, Agent, or Firm* — Oblon, McClelland, Maier & Neustadt, L.L.P.

(57) ABSTRACT

A computer implemented method for comparing unsupervised embedding methods for a similarity based industrial component model requesting system including obtaining a text corpus relating to industrial component models and a list of testing words, modifying by altering some of the occurrences of each testing word, the modified text corpus containing, for each testing word, occurrences of a first version of each testing word, and occurrences of a second version of each testing word, running an unsupervised embedding method on the modified text corpus and obtaining vector representations, determining a scoring value, by comparing, for at least some of the testing words, the vector representations of the first version of these testing words, and the vector representations the second version of these testing words, running the obtaining, modifying with the text corpus and the list of testing words with another unsupervised embedding method and returning the respective scoring values.

17 Claims, 2 Drawing Sheets

(56) References Cited

U.S. PATENT DOCUMENTS

2018/0285344 A1 10/2018 He et al.
2020/0372106 A1* 11/2020 Liu .................. G06N 20/00

OTHER PUBLICATIONS

Schnabel, Tobias, et al. "Evaluation methods for unsupervised word embeddings." Proceedings of the 2015 conference on empirical methods in natural language processing. 2015. (Year: 2015).*

Khabiri, Elham, et al. "Industry specific word embedding and its application in log classification." Proceedings of the 28th acm international conference on information and knowledge management. 2019. (Year: 2019).*

Bogumil Kaminski, et al.; "An Unsupervised Framework for Comparing Graph Embeddings"; arxiv.org; Conrell University Library, 201 Olin Library Cornell University, Ithaca, NY 14853; May 29, 2019; XP081879296; 27 pgs.

Tobias Schnable, et al.; "Evaluation Methods for Unsupervised Word Embeddings"; Proceedings of the 2015 Conference on Empirical Methods in Natural Language Processing; Jan. 1, 2015; XP055790294; Stroudsburg, PA, USA; Retrieved from the Internet: URL:https://www.aclweb.org/anthology/D15-1036.pdf>, retrieved on Mar. 25, 2021; 10 pgs.

Extended Search Report issued Apr. 7, 2021 in European Patent Application No. 20306250.0-1231; 11 pgs.

Paul Opuchlich; "Comparing Unsupervised Word Embedding Models to Build a Large Scale Text Recommendation System"; Abstract Only: Oct. 14, 2019; XP055790140; Retrieved from the Internet: URL:https://www.researchgate.net/profile/Paul-Opuchlich/publication/340492012_Comparing_unsupervised_word_embedding_Models_to_build_a_large_scale_Text_Recommendation_System_links_5e8cd31aa6fdocs789fdd94e/Comparing-unsupervised-word-embedding-Models-to-build-a-large-scale-Text-Recommendation-System.pdf; Retrieved on Mar. 25, 2021; 2 pgs.

Michael Kazhdan, et al.; "Harmonic 3D Shape Matching"; International Conference on Computer Graphics and Interactive Techniques ACM SIGGRAPH 2002; Jul. 21-26, 2002; San Antonio, Texas, USA; ACM New York; 2 Penn Plaza, Suite 701 New York NY 10121-0701, USA; Jul. 21, 2002; XP058143502; ISBN: 978-1-58113-525-1; 1 page.

* cited by examiner

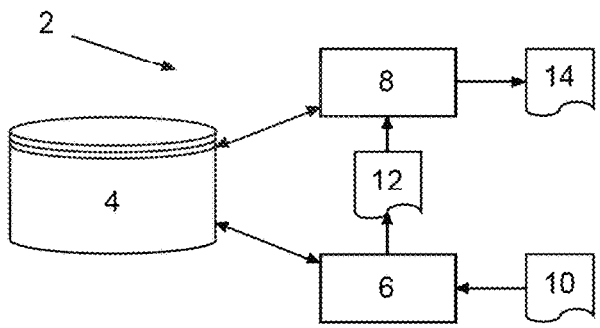
Fig.1
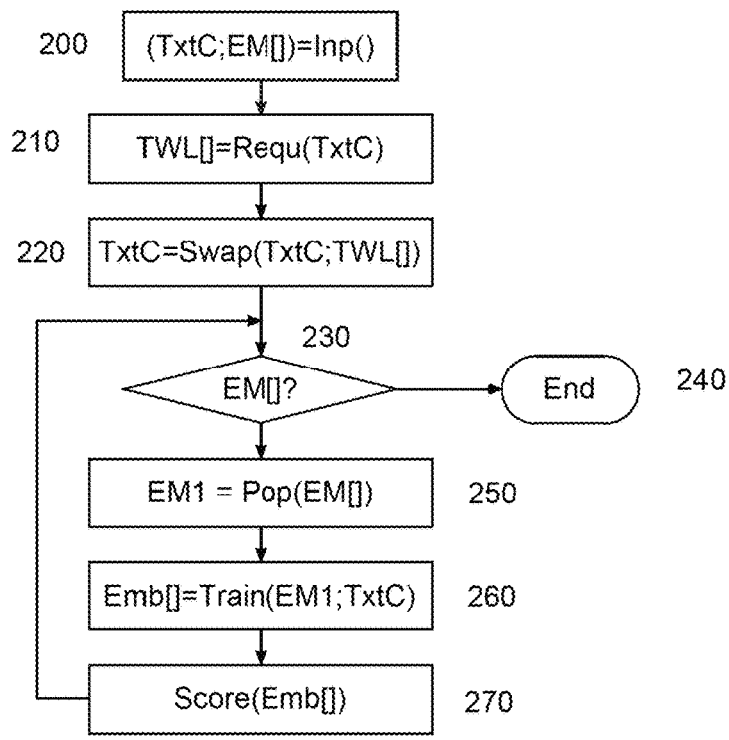
Fig.2
Fig.3
| Component ID | Description | Material | Shape signature | ... | Similarity data |
|---|---|---|---|---|---|
| HF0S9210 | Lorem ipsum dolor sit | Aluminum | [1.2352, 9.3453, 2.6234, 5.1313] | ... | f74f0310 d45c714e 99089de4 |
| ZW049285 | sed do eiusmod | Steel | [3.2552, 8.1153, 0.00123, 2.2335] | ... | ecef8fc7 |
| GJ154003 | incididunt ut labore | Aluminum | [1.3078, 9.3001, 2.7982, 4.8134] | ... | d45c714e 99089de4 |

| Component ID | Description | Type | Nominal capacitance | Working voltage | ... | Similarity data |
|---|---|---|---|---|---|---|
| HF059210 | Lorem ipsum dolor sit | Capacitor | 4700μF | 25V | ... | f74f0310 d45c714e 99089de4 |
| ZW049285 | sed do eiusmod | Resistor | 0.05pF | 75V | ... | ecef8fc7 |
| GJ154003 | Incididunt ut labore | Capacitor | 4700μF | 23V | ... | d45c714e 99089de4 |

30 → Component ID
32 → Description, Type, Nominal capacitance, Working voltage
34 → Similarity data

UNSUPERVISED EMBEDDING METHODS FOR SIMILARITY BASED INDUSTRIAL COMPONENT MODEL REQUESTING SYSTEMS

CROSS-REFERENCE TO RELATED APPLICATIONS

This application claims priority under 35 U.S.C. § 119 or 365 to European Application No. 20306250.0, filed Oct. 20, 2020. The entire contents of the above application(s) are incorporated herein by reference.

FIELD

The disclosure concerns a computer implemented method for comparing unsupervised embedding methods for a similarity based industrial component model requesting system.

BACKGROUND

When performing design work, whether for a mechanical object or for an electronic circuit, it is generally preferred to use parts which exhibit replaceability. By replaceability it is meant that a given part maybe replaced by another part in the design without altering the specifications required for the final product.

In that regards, the identification of parts which can be used to replace each other is a challenging task, but also a crucial one in order to streamline sourcing and to reuse parts whose behavior is well known, and thus improve the reliability of the designs.

In the case of electronic parts, this is usually done by the manufacturers themselves, by defining standardized data relating to the fit, form and function of parts. In the case of mechanical parts, this is usually done by creating signatures for each part, which is based on the topological analysis of the component shape. The article "Harmonic 3D shape matching" by Kazdhan et al., SIGGRAPH Sketches and Applications (2002) shows an example of one such method.

These methods have their pros and cons, but mostly they are not built or fit to take into account user feedback. In other words, these methods are based on theoretical models, and they are immutable, unless one alters the models themselves.

Another solution to achieve these recommendations is to perform embeddings of the words which characterize the industrial component models which are considered, and to compare the embeddings to perform the search request. In this case, autoencoders or unsupervised embeddings methods can be used.

The latter have the advantage of being faster to put into action than autoencoders, the training times are quicker than autoencoders, and there is a large corpus of existing methods to choose from.

However, besides the parameters which are being optimized by the machine learning, these methods involve the use of hyperparameters which influence the way in which the machine learning process is performed. The choice and subsequent fine tuning of the hyperparameters are hard to perform, because it is hard to compare the capacity of a method to provide significant similarity of the resulting embeddings.

SUMMARY

The disclosure aims at improving the situation. To this end, Applicant describes a computer-implemented method for comparing unsupervised embedding methods for a similarity based industrial component model requesting system, comprising:
  a) providing a text corpus relating to industrial component models and a list of testing words,
  b) modifying the text corpus by altering some of the occurrences of each testing word of the list of testing words, the modified text corpus thus containing, for each testing word, occurrences of a first version of each testing word, and occurrences of a second version of each testing word,
  c) running an unsupervised embedding method on the modified text corpus and obtaining vector representations of the words of the modified text corpus;
  d) determining a scoring value associated with the unsupervised embedding method, by comparing, for at least some of the testing words, the vector representations of the first version of these testing words, and the vector representations the second version of these testing words;
  e) running steps b) to d) with the text corpus and the list of testing words of step a) with another unsupervised embedding method and returning the respective scoring values.

This method is advantageous because it allows to compare unsupervised embedding methods between them, and then to perform fine tuning of the hyperparameters in an efficient and reliable manners.

In various embodiments, the method may present one or more of the following features:
  step b) of modifying the text corpus by altering at least half of the occurrences of each testing word includes modifying substantially half of the occurrences of the testing words to a chosen alias absent from the text corpus, and leaving the other occurrences unchanged,
  step b) of modifying the text corpus by altering at least half of the occurrences of each testing word includes modifying substantially half of the occurrences of the testing words to a chosen alias absent from the text corpus, and modifying the other occurrences to another chosen alias absent from the text corpus,
  the list of testing words is predetermined,
  the list of testing words is obtained by determining a logarithmic frequency distribution of the words within the text corpus, and by choosing words evenly spaced in the logarithmic frequency distribution,
  step d) includes determining a scoring value of a testing word based on a similarity distance between the embedding of the first version of the testing word and the embedding of the second version of the testing word,
  step d) includes determining a scoring value of a testing word by determining the similarity distance between the embedding of the first version the testing word and the embeddings of all other words, the similarity distance between the embedding of the second version of the testing word and the embeddings of all other words and returning one of:
    the number of words which embeddings are closer to the embeddings of the first version of the testing word than to the embedding of the second version of the testing word,
    the number of words which embeddings are closer to the embeddings of the second version of the testing word than to the embedding of the first version of the testing word, and the sum of the number of words which embeddings are closer to the embeddings of the first version of the testing word than to the embedding of the second version of the testing word and the number of words which embeddings are closer to the embeddings of the second version of the testing word than to the embedding of the first version of the testing word, step d) includes determining a scoring value score by averaging the scoring values of at least some of the testing words, and step d) includes determining a scoring value score by returning the scoring values of at least of the score values of the testing words and the corresponding testing words.

The disclosure also concerns a computer program comprising instructions for performing the method according to an embodiment, a data storage medium having recorded thereon such a computer program and a computer system comprising a processor coupled to a memory, the memory having recorded thereon such a computer program.

BRIEF DESCRIPTION OF THE DRAWINGS

Other features and advantages of the disclosure will readily appear in the following description of the drawings, which show exemplary embodiments and on which:

FIG. 1 shows a general diagram view of a system according to the embodiments,

FIG. 2 shows an exemplary embodiment of a function executed by the system of FIG. 1, FIG. 3 and FIG. 4 illustrate embodiments of industrial component model data which are used in the system according to the embodiments.

DETAILED DESCRIPTION

Figures 4, 5:
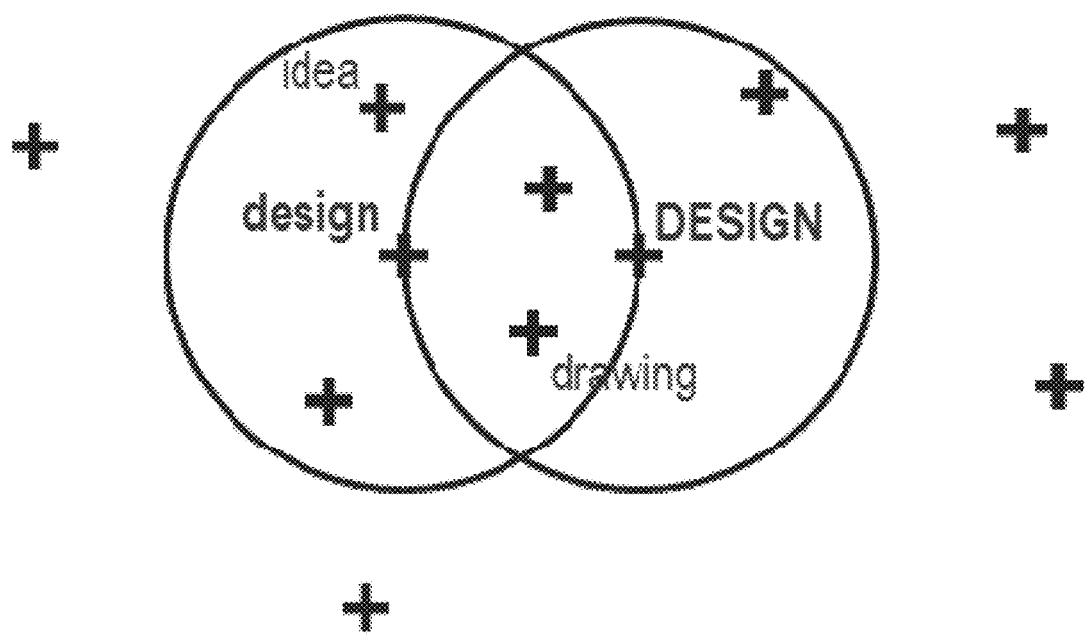
FIG. 5 illustrates similarity distances determined according to an operation of FIG. 2.

The drawings and the following description are comprised for the most part of positive and well-defined features. As a result, they are not only useful in understanding the disclosure, but they can also be used to contribute to its definition, should the need arise.

The description may make reference or use elements protected or protectable by copyright. The Applicant does not object to the reproduction of those elements in as much as it is limited to the necessary legal publications, however this should not be construed as a waiver of rights or any form of license.

FIG. 1 shows a general diagram view of a system according to the embodiments. The system 2 comprises a memory 4, a corpus modifying unit 6 and a scoring unit 8.

The memory 4 stores industrial component model data. The industrial component model data comprises any data which allows to define a mechanical or electronic part, as well as attributes which allow to describe the industrial component model to a designer as well as to search for this industrial component model.

The industrial component model data is used in a similarity based industrial component model requesting engine which uses an unsupervised embedding method to embed the industrial component models and performs industrial component models requests based on the comparison of the embeddings.

In the example described herein, the memory 4 may be realized in any way suitable, that is by means of a hard disk drive, a solid-state drive, a flash memory, a memory embedded in a processor, a distant storage accessible in the cloud, etc.

In the example described herein, the corpus modifying unit 6 and the scoring unit 8 are computer programs which are executed on one or more processors. Such processors include any means known for performing automated calculus, such as CPUs, GPUs, CPUs and/or GPUs grids, remote calculus grids, specifically configured FPGAs, specifically configured ASICs, specialized chips such as SOCs or NOCs, AI specialized chips, etc.

The corpus modifying unit 6 computes modified corpus data 12 based on the industrial component model data in memory 4, and the scoring unit 8 allows a user to input unsupervised embedding methods 10 and to receive return data 14 which quantify the ability of the input supervised methods 10 to produce embeddings which properly reflect similarity between members of the industrial component model data. Return data 14 enables the user to choose between families of unsupervised methods, and to fine tune the hyperparameters of a given unsupervised Dmethod.

FIG. 2 represents an exemplary embodiment of a function executed by system 2. This exemplary embodiment represents operations that the system 2 can perform in order to execute the embodiments.

This function starts with an operation 200 in which a function Inp( ) is executed. Function Inp( ) is an input function in which a set of unsupervised embedding methods EM[ ] and a text corpus TxtC are entered as arguments which will be used as a global variable in the other steps.

This can be done by means of a human machine interface (HMI). Any type of HMI can be used as long as it offers an interface through which a user designates or otherwise uploads a file containing unsupervised embedding methods EM[ ] and the text corpus TxtC, or designates entries in the memory 4. The unsupervised embedding methods may be described by identifiers pointing to specific resources or they may be provided in full detail, including hyperparameters. In the example described here, the unsupervised embedding methods EM[ ] are stored in a list in which each entry contains a different unsupervised embedding method. By different unsupervised embedding method, it should be understood that two methods which only differ by their sets of hyperparameters are considered as different. In an embodiment, the list EM[ ] maybe enriched automatically by generating varying sets of hyperparameters for an input unsupervised embedding method.

FIGS. 3 and 4 show examples of tables containing the attributes associated with industrial component models. The table of FIG. 3 contains mechanical parts industrial component models, whereas the table of FIG. 4 contains electronic parts industrial component models.

As appears in FIGS. 3 and 4, each row comprises the attributes of a single part, and the attributes are distributed across 3 types of columns:

a single part ID column referenced 30, which is a unique identifier for each part;

a set of feature columns referenced 32, which describe predetermined features of each part;

a single similarity data column referenced 34.

For example, in the case of a mechanical part (FIG. 3), these columns may include a description of the part, one or more columns detailing the materials used in this part, one or more columns for storing a shape signature of the part, one or more columns for storing the dimensions of this part, one or more columns for storing relevant measurements of this part (for example hardness, etc.), etc. Similarly, in the case of an electronic part (FIG. 4), these columns may include a part type (to describe which type of electronic function is achieved), measurements columns for describing nominal values and operating values as well as limit values, etc. All of these columns can be considered as "objective features", as they describe common measurements or features which characterize the physical properties of the part.

The similarity data column may be empty. When it is filled, it comprises a list of hash codes which allow to associate parts together. In other words, when two or more parts have been considered as similar, a unique hash code is generated to associate represent the association of these parts together, and this hash code is added in the "Similarity data" column of each of these parts. For example, turning to FIG. 3, parts HF059210 and GJ154003 have both been part of a set of parts considered similar which received the hash code 99089de4. Part HF059210 was further considered similar in two other sets, designated respectively by hash code f74f0310 and d45c714e.

Operation 200 is followed by operation 210, in which a function Requ( ) receives the text corpus TxtC as an argument and returns a table TWL[ ] as a result. Function Requ( ) is used to establish a set of words which will be used for assessing the ability of the unsupervised embedding methods to produce embeddings which properly reflect similarity. The table TWL[ ] comprises tokens of the corpus TxtC which will be used to create synonyms to score the unsupervised embedding methods. By token, it should be understood as directed to a single word or a set of words grouped in a phrase, that is, multi-word expressions (typically 1 to 4 words), for which it is considered that they should be processed as a single word. In this case, the corpus TxtC may be generally processed to unite the words of a phrase by removing the spaces between them or by replacing the spaces by a token sign such as "_" (underscore), such that a phrase appears as a single word.

In an embodiment, the table TWL[ ] is input by a user, or selected by a user. In another embodiment, the function Requ( ) performs a systematic analysis, for instance based on word frequency. Advantageously, this analysis may classify words according to logarithmic frequency, and the words input in the table TWL[ ] may be evenly spaced between them on this logarithmic frequency scale. While the logarithmic frequency scale is used because it is particularly suited to text based documents, other scales may be suitable, such as linear scale, or any other scale suiting the documents being analyzed.

For example, this can be done by computing all logarithmic frequencies, taking the two extreme values and dividing the difference between these values divided by the target number of words in table TWL[ ] in order to define a logarithmic step.

The words can thereafter be chosen based on their respective logarithmic frequencies, for example by choosing the word which has the closest logarithmic frequency to a multiple of the logarithmic step added to one of the extreme values, or by adding words whose logarithmic frequency are close to such a value. As will be explained later, in the latter case, the scoring value can be averaged when several words are retained for a given logarithmic frequency.

Using the logarithmic frequency allows to make sure that the unsupervised embedding method is tested over the whole range of the corpus, not only for the most common words. Furthermore, using several words around a given logarithmic frequency allows to deepen this effect, thereby limiting false positive or false negatives in terms of scoring.

After the table TWL[ ] has been determined, the corpus modifying unit 6 executes a function Swap( ) in an operation 220. The function Swap( ) receives corpus TxtC and table TWL[ ] as arguments and returns a modified version of the corpus TxtC as a result. The function Swap( ) has the role to create "known synonyms" in the corpus TxtC by altering some or all of the occurrences of the words in the table TWL[ ]. In order to do so, an alias can be created for each word in the table TWL[ ], and this alias can be used to replace some of the occurrences of the word in the corpus TxtC. This replacement can be systematic (one every two occurrences), or pseudo-random (for instance to insure that for each word in table TWL[ ] there are about half of the original, and half of the alias in the returned corpus TxtC). By replacing these words, the function Swap( ) effectively generates known synonyms, since they were the same word to begin with. Alternatively, the function Swap( ) may create two aliases for each word in table TWL[ ], and use both alternatively when parsing corpus TxtC, such that the resulting corpus will contain roughly half of first aliases and half of second aliases, and none of the original words in table TWL[ ]. Of course, where several words are input in table TWL[ ] for a given logarithmic frequency, it is necessary to keep track of that within function Swap( ) in order to average the scoring value later. It will appear readily that aliases are necessarily words which are absent from the corpus TxtC. The aliases can be stored in table TWL[ ] along with the word they are made to correspond to, or elsewhere. All that matters is that a correspondence be maintained between the words of table TWL[ ] and their respective alias or aliases.

After operation 220, the corpus modifying unit 6 has finished preparing the corpus TxtC for system 2, and a loop is launched to compare the unsupervised embeddings methods between them. In an alternative embodiment, the loop can be replaced by parallelizing the training and scoring of the unsupervised embedding methods being compared. All the following operations are performed by the scoring unit 8.

The loop starts with an end condition test which tests the list EM[ ] in an operation 230. If the list EM[ ] is empty, then all methods have been tested and the function can end in a operation 240. Else, list EM[ ] is popped in an operation 250, and the result is an unsupervised embedding method EMI that needs to be scored.

Thereafter, a function Train( ) is executed in an operation 260. Function Train( ) receives the corpus TxtC modified by corpus modifying unit 6 in operation 220 and the unsupervised embedding method EMI as arguments, performs a training of the embedding method EMI on the corpus TxtC, and returns the resulting embeddings of the words of table TWL[ ] and their aliases in a table Emb[ ].

In a final operation 270 of the loop, a function Score( ) is executed. Function Score( ) receives the table Emb[ ] as an argument, and returns a scoring value or a scoring vector. In order to compute said a scoring value or a scoring vector, function Score( ) performs various calculus on the embeddings of table EmbH and may proceed differently depending which type of synonymity assessment is sought.

For example, in one embodiment, function Score( ) may calculate the similarity between the known synonyms of table TWL[ ] using a similarity measure used identify synonyms, for instance, cosine similarity or another similarity measure. The cosine similarity is performed on the respective embeddings of each word in table TWL[ ] and their corresponding alias or aliases.

In another embodiment, the similarity measure may be calculated between each word of the table TWL[ ] and all of the embeddings produced by the training operation 260. In this case, operation 260 may be performed such that table Emb[ ] stores the embeddings for all the words of corpus TxtC. Thereafter, function Score( ) may determine the number of words that are more similar to one known synonym than to another.

Accordingly, the score may be based, for a given pair of known synonyms, on the count of:
the number of words closer to the first known synonym than to the second known synonym. On FIG. 5, where the first version is the word "design", and the second version is the word "DESIGN", there are 4 words closer to the first version than to the second version, including "drawing" and "idea". Other "+" signs indicate other words in the modified corpus;
the number of words closer to the second known synonym than to the first known synonym. On FIG. 5, there are three such words, including "drawing";
the number of words closer to the first known synonym than to the second known synonym and to the second known synonym than to the first known synonym. On FIG. 5, there are two such words, including "drawing"

The first option (direct similarity measure between known synonyms) is simpler and faster than the second option. It is possible when evaluating the capability of the unsupervised embedding methods to provide an absolute semantic similarity metric. The second option is used when evaluating the capability of the unsupervised embedding method to produce a relative similarity metric, i.e. the similarity value is only supposed to be consistent locally in the embedding space. When operation 210 includes introducing several words in table TWL[ ] for one or more logarithmic frequencies, then the function Score( ) should return a value which weights the corresponding scores.

As a result, function Score( ) may return a table of all the scores for the words in table TWL[ ], or a generic score which weights those scores between them. In the latter case, the system may be used to optimize the hyperparameters of a given unsupervised embedding method, by comparing many different versions of the same method with different hyperparameters and comparing their scores.

The invention claimed is:

1. A computer implemented method for comparing unsupervised embedding methods for a similarity based industrial component model requesting system, comprising:
   a) obtaining a text corpus relating to industrial component models and a list of testing words;
   b) modifying the text corpus by altering some of occurrences of each testing word of the list of testing words, the modified text corpus containing, for each testing word, occurrences of a first version of each testing word, and occurrences of a second version of each testing word;
   c) running an unsupervised embedding method on the modified text corpus and obtaining vector representations of the words of the modified text corpus;
   d) determining a scoring value associated with the unsupervised embedding method, by comparing, for at least some of the testing words, the vector representations of a first version of the testing words, and the vector representations of a second version of the testing words; and
   e) running steps b) to d) with the text corpus and the list of testing words of step a) with another unsupervised embedding method and returning the respective scoring values, wherein step d) includes determining a scoring value of a testing word by determining a similarity distance between the embedding of the first version of the testing word and embeddings of all other words, the similarity distance between the embedding of the second version of the testing word and the embeddings of all other words and returning one of:
   a number of words which embeddings are closer to the embeddings of the first version of the testing word than to the embedding of the second version of the testing word,
   a number of words which embeddings are closer to the embeddings of the second version of the testing word than to the embedding of the first version of the testing word, and
   a sum of the number of words which embeddings are closer to the embeddings of the first version of the testing word than to the embedding of the second version of the testing word and the number of words which embeddings are closer to the embeddings of the second version of the testing word than to the embedding of the first version of the testing word.

2. The computer implemented method of claim 1, wherein step b) of modifying the text corpus by altering some of the occurrences of each testing word of the list of testing words includes modifying substantially half of the occurrences of the testing words to a chosen alias absent from the text corpus and leaving other occurrences unchanged.

3. The computer implemented method of claim 1, wherein step b) of modifying the text corpus by altering some of the occurrences of each testing word of the list of testing words includes modifying substantially half of the occurrences of the testing words to a chosen alias absent from the text corpus and modifying other occurrences to another chosen alias absent from the text corpus.

4. The computer implemented method of claim 1, wherein the list of testing words is predetermined.

5. The computer implemented method of claim 1, wherein the list of testing words is obtained by determining a logarithmic frequency distribution of the words within the text corpus, and by choosing words evenly spaced in the logarithmic frequency distribution.

6. The computer implemented method of claim 1, wherein step d) includes determining a scoring value of a testing word based on a similarity distance between the embedding of the first version of the testing word and the embedding of the second version of the testing word.

7. The computer implemented method of claim 1, wherein step d) includes determining a scoring value score by averaging the scoring values of at least some of the testing words.

8. The computer implemented method of claim 1, wherein step d) includes determining a scoring value score by returning the scoring values of at least of the score values of the testing words and corresponding testing words.

9. A non-transitory computer readable medium having stored thereon a program that when executed by a computer causes the computer to implement a method for comparing unsupervised embedding methods for a similarity based industrial component model requesting system, comprising:
   a) obtaining a text corpus relating to industrial component models and a list of testing words;
   b) modifying the text corpus by altering some of occurrences of each testing word of the list of testing words, the modified text corpus containing, for each testing word, occurrences of a first version of each testing word, and occurrences of a second version of each testing word;

c) running an unsupervised embedding method on the modified text corpus and obtaining vector representations of the words of the modified text corpus;

d) determining a scoring value associated with the unsupervised embedding method, by comparing, for at least some of the testing words, the vector representations of a first version of the testing words, and the vector representations of a second version of the testing words; and e) running steps b) to d) with the text corpus and the list of testing words of step a) with another unsupervised embedding method and returning the respective scoring values, wherein step d) includes determining a scoring value of a testing word by determining a similarity distance between the embedding of the first version of the testing word and embeddings of all other words, the similarity distance between the embedding of the second version of the testing word and the embeddings of all other words and returning one of:

a number of words which embeddings are closer to the embeddings of the first version of the testing word than to the embedding of the second version of the testing word, a number of words which embeddings are closer to the embeddings of the second version of the testing word than to the embedding of the first version of the testing word, and a sum of the number of words which embeddings are closer to the embeddings of the first version of the testing word than to the embedding of the second version of the testing word and the number of words which embeddings are closer to the embeddings of the second version of the testing word than to the embedding of the first version of the testing word.

10. The non-transitory computer readable medium of claim 9, wherein step b) of modifying the text corpus by altering some of the occurrences of each testing word of the list of testing words includes modifying substantially half of the occurrences of the testing words to a chosen alias absent from the text corpus and leaving other occurrences unchanged.

11. The non-transitory computer readable medium of claim 9, wherein step b) of modifying the text corpus by altering some of the occurrences of each testing word of the list of testing words includes modifying substantially half of the occurrences of the testing words to a chosen alias absent from the text corpus and modifying other occurrences to another chosen alias absent from the text corpus.

12. The non-transitory computer readable medium of claim 9, wherein the list of testing words is predetermined.

13. The non-transitory computer readable medium of claim 9, wherein the list of testing words is obtained by determining a logarithmic frequency distribution of the words within the text corpus, and by choosing words evenly spaced in the logarithmic frequency distribution.

14. The non-transitory computer readable medium of claim 9, wherein step d) includes determining a scoring value of a testing word based on a similarity distance between the embedding of the first version of the testing word and the embedding of the second version of the testing word.

15. The non-transitory computer readable medium of claim 9, wherein step d) includes determining a scoring value score by averaging the scoring values of at least some of the testing words.

16. The non-transitory computer readable medium of claim 9, wherein step d) includes determining a scoring value score by returning the scoring values of at least of the score values of the testing words and corresponding testing words.

17. A computer system comprising:
a processor coupled to a non-transitory memory, the non-transitory memory having recorded thereon a computer program for comparing unsupervised embedding methods for a similarity based industrial component model requesting system that when executed by the processor, causes the processor to a) obtain a text corpus relating to industrial component models and a list of testing words, b) modify the text corpus by altering some of occurrences of each testing word of the list of testing words, the modified text corpus containing, for each testing word, occurrences of a first version of each testing word, and occurrences of a second version of each testing word, c) run an unsupervised embedding method on the modified text corpus and obtain vector representations of the words of the modified text corpus, d) determine a scoring value associated with the unsupervised embedding method, by comparing, for at least some of the testing words, the vector representations of a first version of the testing words, and the vector representations of a second version of the testing words, and e) run b) to d) with the text corpus and the list of testing words of a) with another unsupervised embedding method and return the respective scoring values, wherein the processor is further configured in d) to determine a scoring value of a testing word by determining a similarity distance between the embedding of the first version of the testing word and embeddings of all other words, the similarity distance between the embedding of the second version of the testing word and the embeddings of all other words and returning one of:

a number of words which embeddings are closer to the embeddings of the first version of the testing word than to the embedding of the second version of the testing word, a number of words which embeddings are closer to the embeddings of the second version of the testing word than to the embedding of the first version of the testing word, and a sum of the number of words which embeddings are closer to the embeddings of the first version of the testing word than to the embedding of the second version of the testing word and the number of words which embeddings are closer to the embeddings of the second version of the testing word than to the embedding of the first version of the testing word.

* * * * *